United States Patent
Joy et al.

[11] Patent Number: 5,929,609
[45] Date of Patent: Jul. 27, 1999

[54] VEHICULAR POWER MANAGEMENT SYSTEM AND METHOD

[75] Inventors: George Cecil Joy, Bernardsville, N.J.; Bernard Paul Gollomp, Palisades, N.Y.; Thirumalai Gounder Palanisamy, Morristown, N.J.

[73] Assignee: AlliedSignal Inc.

[21] Appl. No.: 09/066,495

[22] Filed: Apr. 24, 1998

Related U.S. Application Data

[63] Continuation of application No. 08/745,236, Nov. 8, 1996, abandoned.

[51] Int. Cl.⁶ .................................................. H02J 7/14
[52] U.S. Cl. ............................ 322/25; 322/23; 322/29
[58] Field of Search ............................... 320/64; 322/23, 322/25, 28, 29

[56] References Cited

U.S. PATENT DOCUMENTS

| | | | |
|---|---|---|---|
| 4,659,977 | 4/1987 | Kissel et al. | 320/64 |
| 5,385,126 | 1/1995 | Matthews | 123/179.21 |
| 5,404,106 | 4/1995 | Matsuda | 324/431 |
| 5,467,008 | 11/1995 | Uchinami | 322/27 |
| 5,481,176 | 1/1996 | DeBiasi et al. | 322/7 |
| 5,614,809 | 3/1997 | Kiuchi et al. | 322/11 |
| 5,623,194 | 4/1997 | Boll et al. | 320/15 |

*Primary Examiner*—Nestor Ramirez
*Assistant Examiner*—Nicholas Ponomarenko
*Attorney, Agent, or Firm*—Loria B. Yeadon

[57] ABSTRACT

A system and method according to the present invention monitors battery status and engine conditions and controls the alternator to selectively charge the battery depending upon specified battery and engine conditions to optimize the health and operating characteristics of the battery and engine, resulting in reduced fuel consumption.

27 Claims, 6 Drawing Sheets

VEHICULAR POWER MANAGEMENT SYSTEM AND METHOD

CROSS-REFERENCE TO RELATED APPLICATION

This is a continuation of application Ser. No. 08/745,236, filed Nov. 8, 1996, now abandoned.

BACKGROUND OF THE INVENTION

1. Field of the Invention

This invention relates to a system and method for managing a motor vehicle's electric power and more particularly to a system and method for monitoring and determining battery and engine conditions and for controlling an alternator to selectively charge the battery to optimize battery health and performance while efficiently utilizing engine power to improve fuel economy.

2. Description of Related Art

A conventional electric power management system in a motor vehicle such as an automobile uses a battery to supply the vehicle's electrical needs with an alternator or generator (hereinafter "alternator") for charging the battery under regulation by a regulator. Power drawn from the battery is replenished by charging from the alternator, which in turn derives energy from the vehicle's engine. The regulator monitors the battery voltage and regulates the battery voltage by passing or limiting the charge supplied from the alternator. Typically, whenever an engine is operating, the alternator is operated to provide electrical energy to the vehicle and to charge the battery, regardless of battery conditions. The battery provides all electric energy needed by the vehicle when the alternator is turned off. A handbook published by Robert Bosch GmbH and the Society of Automotive Engineers, Inc., "Automotive Electric/Electronic Systems", 1988, pages 18 to 69, describes the principles of operation of alternators and regulators.

Numerous factors contribute to a battery's performance and health. By monitoring simply the battery voltage, as in most conventional automotive battery charge systems, the true condition and health of a battery cannot be determined and battery health and performance cannot be optimized. Factors affecting battery performance include the battery's state of charge, capacity, condition of the battery terminals, level and concentration of the electrolyte, load conditions, plate area, temperature, and internal resistance. Most of these parameters vary depending on operating conditions. When the battery is being charged by the alternator/generator, the voltage measured across the battery (battery charging voltage) is made up largely of two factors: (1) the counterelectromotive force (CEMF) and (2) internal voltage drop. The CEMF is the potential which the battery charging voltage must overcome in order to charge the battery. Factors affecting the CEMF include the battery charging rate, temperature, concentration of electrolyte, plate area in contact with the electrolyte and state of charge. The battery internal voltage drop is caused by current flowing through the internal resistance of the battery. The internal resistance, which includes ohmic resistance and polarization effects of a battery, is made up largely of the normal resistance to current flow inherent in the connectors, connector straps, welded connections, plate area in contact with the electrolyte, battery temperature, electrical resistivity of the electrolyte, and other factors including sulfated or discharged plates and the condition of the battery terminals. The internal battery voltage drop is calculated by multiplying the charging rate in amperes and the battery resistance in ohms.

Of the factors discussed above affecting battery performance, the state of charge (SOC) is among the most important. SOC proportionally affects the CEMF, e.g., if SOC is high, the CEMF is higher and a larger charging voltage is required to further raise the SOC.

U.S. Pat. No. 5,281,919 to Palanisamy (the '919 patent) explains in detail the factors affecting battery operation and discloses an effective system for monitoring and determining battery operating parameters. The '919 patent discloses software for optimizing battery performance and diagnostic routines for fault identifications. U.S. Pat. No. 4,978,942 (the '942 patent), also to Palanisamy discloses an effective technique for dynamically determining the battery internal resistance. The disclosures in both the '919 and '942 patents are incorporated herein by reference.

With advances in microprocessor technology, vehicular controls employing microprocessors have gained in importance and popularity and since battery operation parameters are largely dynamic, it follows that a processor is well suited for monitoring the various battery conditions in place of the conventional regulator. For example, U.S. Pat. No. 5,404,106 to Matsuda et al. describes a system which monitors battery capacity and calculates battery internal resistance based on voltage, current and temperature measurements. U.S. Pat. No. 5,280,232 to Kohl proposes a processor-based device which determines and calculates state of charge by measurements in separate time increments. U.S. Pat. No. 5,193,067 to Sato proposes a similar approach by using a processor-controlled measurement of the battery's electrolyte specific gravity and temperature. Whether a conventional or an 'intelligent' regulator/alternator is used, the object of the prior art is to charge the battery to 100% state of charge.

As is well known, the electrical energy produced by the alternator is derived from power or energy drawn from the engine, usually by means of the belt and pulley driven by the engine to rotate the alternator. Systems have been proposed to monitor or control the loading effects of the alternator on the engine. For example, U.S. Pat. No. 5,256,959 to Nagano proposes controlling engine load by controlling the alternator's field current. U.S. Pat. No. 4,789,817 to Asakura proposes minimizing alternator load on the engine when load constraints cause loss of engine speed, and U.S. Pat. No. 4,659,977 to Kissel proposes a microprocessor-based regulator for controlling the charging of the battery. The regulator disclosed in Kissel monitors either local ambient or battery temperature and battery voltage level. Vehicle speed is also measured and this data and the battery data are compared with preset values along with engine RPM to control the field windings of the alternator.

It is also well known that when a vehicle is driven by an engine, a fair amount of the energy produced by the engine is dissipated, and thus wasted, when the driver needs to slow or stop the vehicle. Further, when a vehicle is coasting or cruising at fairly constant speed or traveling downhill, the power drawn from the engine is reduced because the vehicle momentum becomes a large portion of the energy required to maintain the vehicle at speed. For purposes of the present invention, these engine and vehicle operation conditions will be referred herein as "surplus energy" modes. It can be seen that if the battery-alternator-engine system can be managed such that the alternator is turned on to charge the battery when the vehicle and/or engine is operating in the surplus energy mode, the surplus kinetic or potential energy which would otherwise have been wasted is recovered in the form of stored electrical energy, resulting in more energy efficient system usage and thus a reduction in the engine's fuel consumption.

Given the availability of the above proposed systems, there exists a need for an alternator/battery power management system which is capable of monitoring and determining battery, engine, and vehicle operation conditions while controlling alternator operations to minimize the effective power drawn from the engine while optimizing battery operations.

SUMMARY OF THE INVENTION

The present invention provides a system and method for controlling an alternator for selectively charging a battery in a vehicle driven by an engine, comprising: a controller having a processor and an associated stored program for monitoring battery status such as state of charge (SOC) or internal resistance; means for determining an engine operating condition including a surplus energy mode and alternator control means for charging the battery during the surplus energy mode. A surplus energy mode occurs when there exists surplus energy by operation of the vehicle and the engine, such as when the vehicle is braking, coasting, cruising at constant speed, decelerating, traveling downhill, or operating at the low end of the engine power curve. The controller also includes means for monitoring declining or diminished engine load states, whereby the fuel demand by the engine is declining or is nearly zero, respectively. The controller may also monitor engine speed to determine engine characteristics. Optionally, the controller includes means for disabling the alternator control means from charging the battery for a given time period after an engine start condition.

Preferably, the means for determining the engine operating condition includes means for indicating the amount of fuel supplied to the combustion engine. If the engine is fuel injected, the fuel supplied to the engine is determined by sensing the electrical energy supplied to a fuel injector. A diminished engine load state may be determined by the means for determining engine operating condition when the electrical energy supplied to the fuel injector has a substantially zero pulse-width. A declining engine load state is determined when the electrical energy supplied to the fuel injector is above a given duration and there is a decline in pulse width duration between two successive fuel injection cycles. The fuel supplied to the engine including the characteristics of fuel injector current may also be determined by deconvolving the vehicle load current waveform into its constituent parts by known logical signal processing techniques. The alternator control means selectively charges the battery by controlling the field excitation current supplied to the alternator. When there is no field excitation current to the alternator, the battery provides all electrical energy required by the vehicle. Preferably, the battery is charged, (i.e., by providing field excitation current to the alternator) whenever a surplus energy mode is detected to raise the SOC of the battery, unless the controller determines that the battery is already fully charged.

According to another illustrative embodiment of the present invention, the alternator is selectively controlled to (a) charge the battery whenever the engine/vehicle is decelerating; (b) not charge the battery during acceleration unless the SOC is below a minimum safety value; and (c) charge the battery under further specified conditions to maintain the battery within a range of SOC percentages known to have optimal charge efficiency.

Further, the controller includes means for monitoring battery status including battery internal resistance, temperature, and battery current in magnitude and directions. When it is determined that the battery is in a low charge state, such as below a given SOC minimum safety value, the selective charging may be overridden and the alternator may be turned-on to charge the battery whenever the engine is operated.

The implementation of the illustrative system and method according to the present invention may be by an 'add-on' aftermarket device installable proximal to the engine/alternator. Alternatively, in a vehicle having an engine control unit (ECU) for monitoring and determining engine and vehicle conditions, the control logic may reside within the ECU of the vehicle. The ECU is installed as original equipment in most late model automobiles for monitoring and controlling engine operations and the software controls according to the embodiments of the present invention may be integrated into the ECU at the factory for monitoring battery and engine conditions and controlling the alternator. In such embodiment, the ECU also monitors and determines the above described surplus energy modes.

BRIEF DESCRIPTION OF THE DRAWINGS

The invention will be more fully understood and further advantages will become apparent when references made to the following detailed description of preferred embodiments of the invention and the accompanying drawings, in which.

Appendix A lists a representative portion of the software program which is usable in connection with the illustrative embodiments according to the present invention.

DESCRIPTION OF PREFERRED EMBODIMENTS

Generally, the vehicular power management system according to the present invention monitors battery and engine conditions and controls the alternator to selectively charge the battery to maximize the battery-alternator-engine output/charge efficiency, resulting in an improved miles per gallon (mpg) rating. For optimizing battery performance, parameters and conditions affecting battery charge and engine load efficiency are monitored. The parameters including battery temperature, internal resistance, and state of charge are continually monitored, calculated and updated by a processor/controller. The alternator is selectively turned on to charge the battery depending upon preselected battery or engine conditions such as when the vehicle/engine is operating in a surplus energy mode. The battery's SOC is preferably maintained above a given minimum safety percentage and within an optimal range of SOC values.

As previously discussed, effective approaches in determining and maintaining the vehicle battery charge conditions are explained in detail in U.S. Pat. No. 5,281,919 to T. Palanisamy, the disclosure of which is incorporated by reference herein.

According to a preferred embodiment of the present invention, the alternator operation is controlled to selectively turn on and off to minimize fuel consumption by the engine to improve the vehicle's mpg performance. For example, the alternator is preferably kept off during conditions of increased power demand from the engine, such as during the engine start-up period and vehicle acceleration, and when it is determined that the battery is above a minimum value of state of charge. The alternator is turned on to charge the battery when the vehicle is in a surplus energy mode such as when the engine is in a declining load state or under further specified conditions when the vehicle is cruising. The system according to the illustrative embodiment of the present invention continually monitors battery status and includes means for alerting the user of a fault condition, such as high internal resistance or a defective battery.

Figure 1:
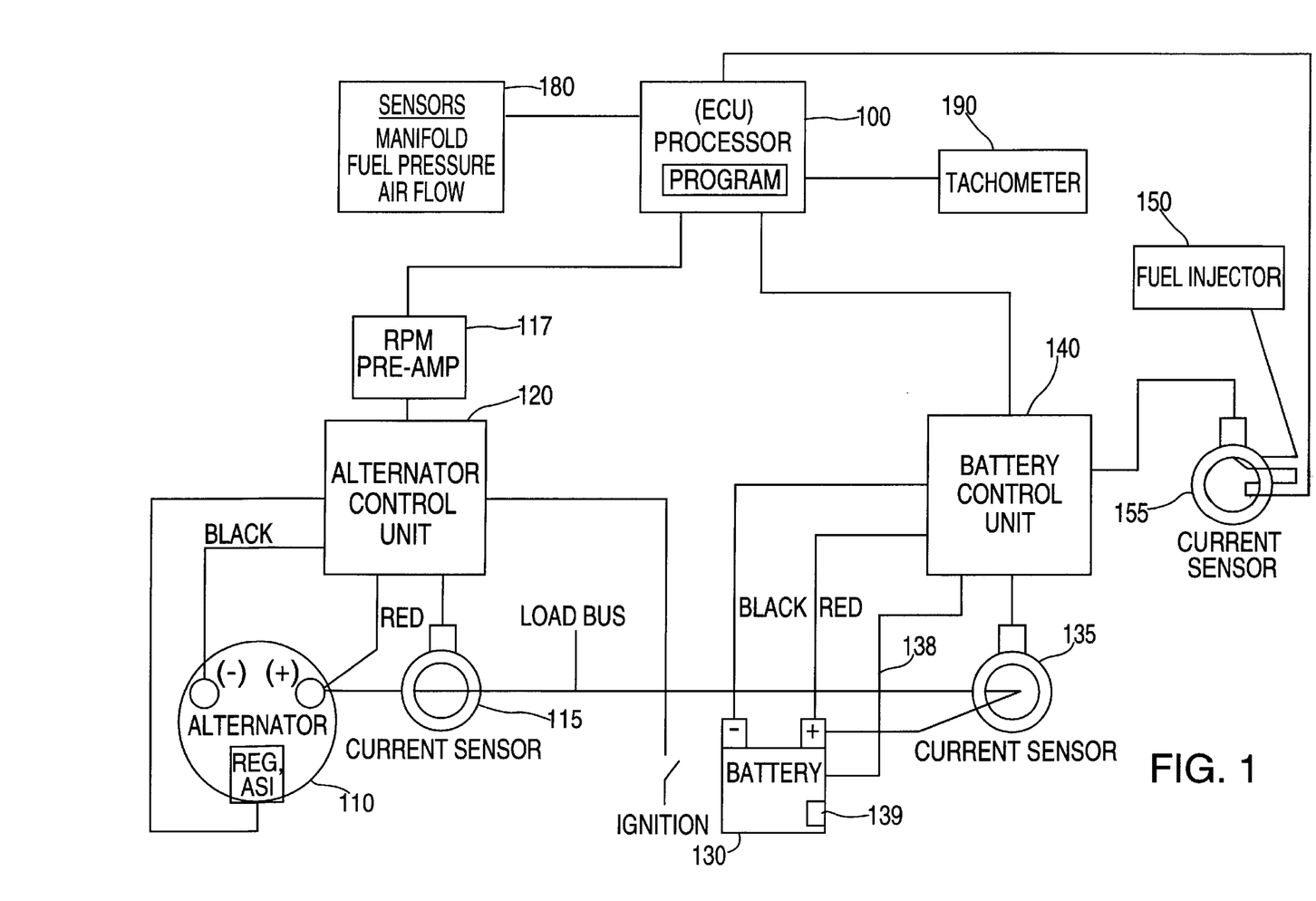
FIG. 1 is a block diagram showing a system for controlling an alternator according to an illustrative embodiment of the present invention.

Referring to FIG. 1, processor 100 and associated memory (not shown) which includes RAM and ROM for storing software to implement the operations of processor controls and the data or tables associated with the battery operating parameters. Processor 100 is connected to alternator control unit 120 and battery control unit 140 for receiving information relating to the alternator and the battery, respectively. It is readily apparent that the processor may skilled in the art that the processor may also be connected to presently existing sensors of the vehicle for monitoring and determining vehicle/engine conditions. For example, manifold, fuel pressure or air flow sensors 180 or a tachometer 190 may be monitored by processor 100 to determine manifold pressure, air flow/fuel ratio, engine RPM, etc.

Alternator control unit 120 is connected between the alternator and the regulator; alternatively, the alternator control unit 120 may replace the regulator. Alternator control unit 120 includes or is connected to current sensor 115 for sensing the current of alternator 110, preferably in magnitude and directions of current flow. Alternator control unit 120 also monitors the alternator voltage and the speed or RPM of the alternator. A conventional 'W' terminal of is the alternator such as shown in the above-referred Bosch SAE handwork, provides an events per unit time which is translated to alternator RPM, which is amplified by RPM preamp 117. Prior to forwarding the information from alternator control unit 120 to processor 100, the information is converted to digital data by an analog to digital converter (ADC) (not shown). Alternative approaches for measuring data digitally can be used, in such a case, the ADC is not needed. Preferably, processor 100 controls the turning on and off of alternator 10 by controlling the alternator field excitation current through alternator control unit 120. The data from processor 100 to alternator control unit 120 is converted to an analog signal by a digital to analog converter in alternator control unit 120.

Battery control unit 140 is connected to the positive and negative terminals of battery 130 for monitoring battery voltage and a current sensor 135, such as a Hall effect transducer, which may be part of battery control unit 140 or may be disposed external to battery control unit 140 and proximal to battery 130, senses the current of battery 130, preferably in both magnitude and directions of current flow. Battery status line 138 connecting battery 130 to battery control unit 140 is for transferring battery status data such as battery temperature, electrolyte level, and gas points. Temperature reading of the battery is preferably by temperature sensing means such as a thermistor 139 disposed adjacent to the environments of battery 130. Battery control unit 140 is also connected to current sensor 155 which is in turn connected to the electronic controls to the fuel injector for monitoring the current flow to and from the fuel injector 150. As will be discussed in further detail below and shown in FIG. 4, current supplied to the fuel injector is a parameter monitored by processor 100 or the ECU. The fuel injector current pulse width is used as one condition for turning on and off alternator 110. The information in battery control unit 140 is also converted to digital signals by an analog to digital converter prior to the data being forwarded to processor 100.

The components of FIG. 1, excluding the alternator and the battery, may be implemented on a circuit card and the like, integrated circuit, or as an 'add-on' 'after-market' device. It is readily apparent to one ordinarily skilled in the art that the various components used or described herein such as the processor, its associated memory, current sensors, amplifier and signal conditioning means, analog to digital and digital to analog converters are generic known components which do not require further description. Further, the structure and functions performed by processor 100, alternator control unit 120 and battery control unit 140 may be integrated with on-board engine control units, which are usually available in later model automobiles. The functions and the associated stored programs may be factory installed.

Figure 2:
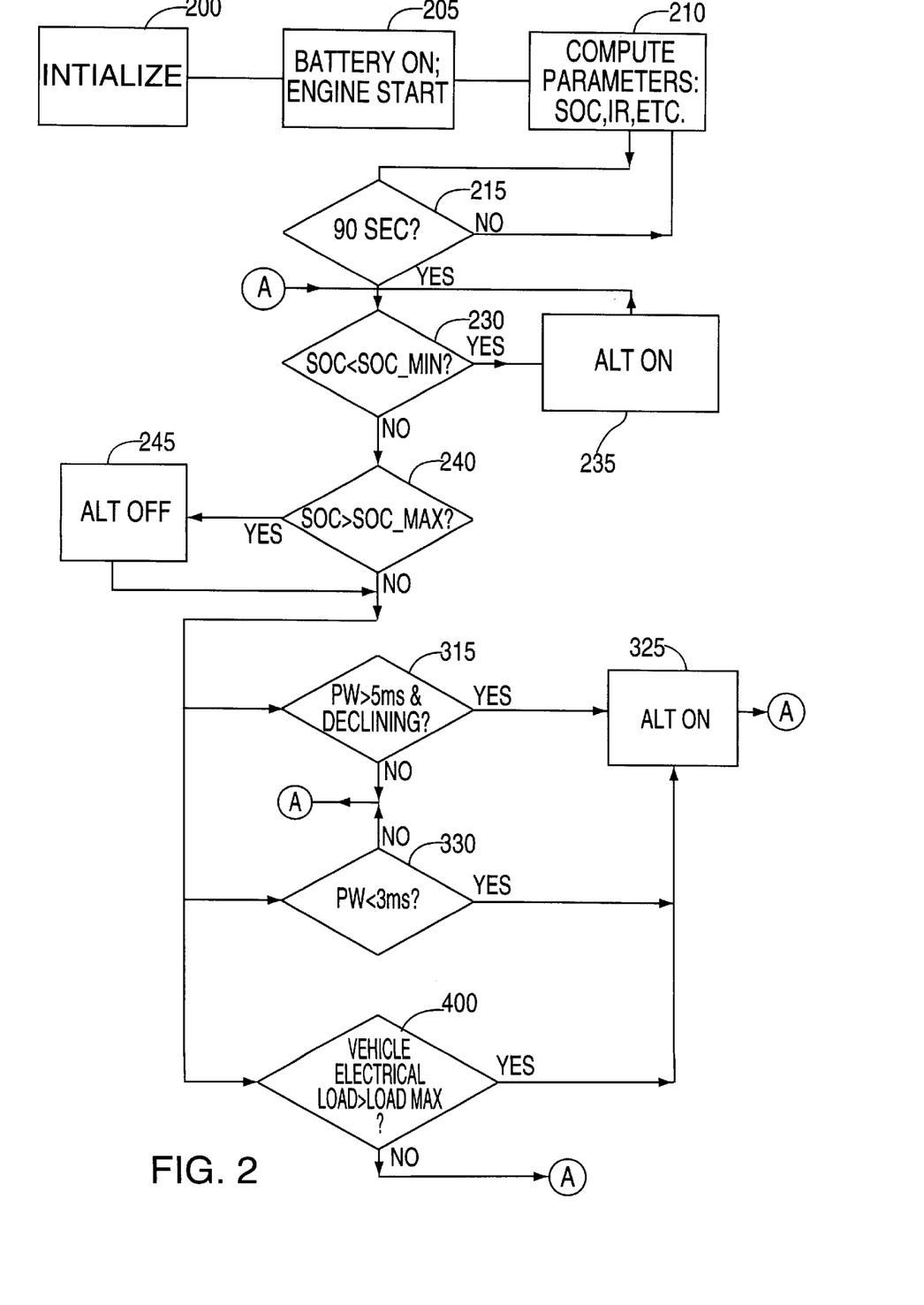
FIG. 2 is a flow diagram of an operation process of the system according to FIG. 1.

FIG. 2 illustrates a representative flow of the alternator control process using the components as shown in FIG. 1 according to the present invention. Before the process begins at 200, processor 100 computes and stores in its associated memory the internal resistance including polarization, state of charge, battery capacity, voltage and other operation data of the battery. Since these values are battery and engine size dependent, they may be estimated and input to the memory at installation. Preset conditions for determining alternator on/off operations are also stored in the associated memory. The conditions preferably include a temperature lower limit, a SOC safety minimum below which the battery should be charged at all times when the engine is operated and a SOC maximum above which the battery should not be charged, an optimal SOC range within which the battery is maintained, timeout periods, conditions for turning the alternator on and off, and other safety overrides, etc. The conditions may be user or factory selectable and entered.

When the vehicle is turned on electrically (prior to engine start) and during engine start, alternator control unit 120 and battery control unit 130 collect operation data and voltage and current information from the various sensors and monitors and forward the information to processor 100, wherein the battery operation data such as SOC and internal resistance are calculated and corresponding estimated values in the tables stored in processor memory are updated.

The battery's state of charge may be calculated using a combination or either one of the charge integration and the open circuit voltage (OCV) techniques. With the latter technique, it has been shown that the OCV of a fully charged lead acid cell exhibits around 0.2 V higher than the OCV of a completely discharged cell. The cell voltage varies linearly in between these extremes. The voltage of a battery when no current is flowing into or out of the battery is normally referred to as the open circuit voltage. Since the automotive lead acid battery normally has six cells and a fully charged battery has around 12.7 V or higher, the state of charge can be calculated as follows:

$$SOC = 100 - \{[12.7 - OCV)/1.2]*100\}\%$$

The cell voltage used in this calculation should be free from polarization. The polarization normally arises from nonuniformity of the electrolyte concentration at or near the electrodes compared with the electrolyte concentration in the bulk. The voltage measured until several minutes after a charge or discharge invariably includes significant polarization voltage, even though there is no substantial current flowing from or to the battery.

The charge integration technique in calculating SOC involves integration of the current that goes into and out of the battery over a given period of time. The monitor starts counting the charge from a predetermined charged state of the battery. The total charge put into the battery from the power source is added to the stored charge of the battery. Similarly the charge taken out of the battery during starting and by the vehicle and its electrical components and accessories is subtracted from the charge. This net charge divided by the battery capacity gives the state of charge of the battery. Anytime the monitor detects that the battery is fully charged, it resets the state of charge to 100%. The fully charged state of the battery is recognized when the open circuit voltage of the battery is above a predetermined value, preferably around 12.7 V. Using the measurements during the starting process, the monitor determines the internal resistance, which can be determined from the instantaneous change in voltage at the beginning and at the end of a current input to or output from the battery. The ordinarily skilled practitioner in the art will appreciate that there are numerous ways of achieving this, as for example, using any of the accessories for a discharge pulse current or the power source of the car for a charge pulse current. According to a preferred embodiment of this invention, the internal resistance (IR) of the automotive battery is determined from its open circuit voltage (OCV), the first measured voltage ($V_S$) and the initial current ($I_S$) that flows from the battery to the starter load during the starting process and according to the equation:

$$IR = (OCV - V_S)/I_S$$

The maximum instantaneous power output of a battery is inversely related to its internal resistance. Thus, the battery's power output capability may be determined from the internal resistance.

The battery polarization resistance ($P_R$) arises from non-uniformity in electrolyte concentration in the electrode to the bulk of the electrolyte between the plates. It is determined from the above parameters, $V_S$ and $I_S$ and the battery voltage after a predetermined time interval or the last voltage reading ($V_1$) during the starting process according to the equation:

$$P_R = (V_S - V_1)/I_S$$

Because numerous parameters affect a battery's SOC as discussed above, the optimum SOC range within which a battery should be maintained for optimized battery performance is different for different batteries. A battery's capacity also affects the SOC. A automobile's battery starting capacity is usually rated in CCA (cold cranking amperes), which is typically in the range of 550 to 1100 CCA for passenger cars and light trucks. A larger engine is usually mated with a battery having a higher CCA. The higher the CCA of a battery for a given automobile, the lower is usually the optimum SOC range. A typical optimum SOC range between a lower charge value and a upper charge value for battery charging is around 85 to around 92% SOC, respectively.

Referring again to FIG. 2, when the engine is started at step 205, a time-out is initiated to disable any current from going to the alternator to turn on the alternator (205). The time-out is for purposes of improved vehicle emission performance and to keep the alternator off during a time of high engine power demand. However, the alternator turn-off or the time-out can be overridden and the alternator turned on if conditions indicate that charging is required for a weak battery, such as when the temperature sensor(s) indicates freezing temperature. The time-out period is vehicle dependent and for purposes of illustration in this example, it is set at around 90 seconds at step 215. Processor 100, in conjunction with alternator control unit 120 and battery control unit 130, continually monitors battery and alternator data and periodically updates the present SOC and internal resistance values (210). After the timeout, the state of charge is compared against the SOC safety minimum value and if the state of charge is below the preset minimum (230), a SOC flag may be turned on to signify to processor 100 to turn on alternator excitation current to charge battery (235). If the updated SOC is above the preset SOC maximum (240), the SOC flag may be turned off at step 245 and the alternator excitation current is turned off. Preferably the SOC safety minimum is set at around 75% and the SOC maximum is set at around 100%.

Various sensors and detectors are available for monitoring engine environmental and load conditions. For example, a processor or the ECU 100 may monitor engine manifold pressure, fuel pressure, engine RPM, air-flow and air-to-fuel ratio, extent of usage of accessories and drive controls, etc. to determine engine load. The manifold and fuel pressure may be derived from pressure sensors, air flow measured from an air-flow sensor and engine RPM or speed is derivable by numerous sensing means including sensors which measure either the alternator or fuel injection frequency, since there is a fixed relationship between the engine, alternator and fuel injector frequencies. A key indicator of engine and environmental load conditions when the engine is operating in essentially all of the surplus energy modes is the amount of fuel drawn by the engine, e.g., when a small amount or no fuel is supplied to the engine, engine demand is low or zero, which signifies that the vehicle is in one of the surplus energy modes of, e.g., vehicle braking, decelerating, coasting, cruising, traveling downhill, etc.

In terms of fuel economy, an automobile is economically operated when it is cruising at a relatively constant speed. During cruise, the engine load is "diminished" as the vehicle's momentum contributes to the energy required to propel the vehicle forward and maintain speed. For example, a vehicle such as a 1992 Ford Taurus cruising at 60 MPH at an engine speed of about 2100 RPM, the engine or road load is about 14% of engine rating and only about 22 horsepower is required from the engine. When the vehicle is driven downhill, the vehicle's potential and kinetic energy provides most if not all of the energy required to move the vehicle. During such diminished engine load states, the fuel drawn by the engine is likewise diminished. It is found that in such diminished engine load state, the fuel drawn by the engine and the engine speed are substantially constant.

Therefore, by monitoring the pulse width of the current supplied to the fuel injector (assuming a fuel injected engine) and engine speed, the engine load condition is determinable. In another example, if the pulse width is near zero at around 2 to 3 milliseconds and the engine speed is above idle speed, the vehicle is likely coasting. The engine load is again diminished and the vehicle is in surplus energy mode. In contrast, the current pulse width during engine start ranges 20 to 23 milliseconds and during acceleration ranges 10 to 12 milliseconds.

As is readily apparent to one ordinarily skilled in the art, the fuel injector provides fuel to the engine upon activation by electrical current. The magnitude of the electrical current is controlled by the processor or ECU. Thus, the amount of current supplied to the fuel injector or the rate of tow of energy to the engine, is not only a measure of the fuel supplied to the engine, but also an indication of the vehicle operating condition, such as in a surplus energy mode. Referring again to FIG. 1, such flow of energy to the engine is controlled by ECU 100 and measured at fuel injector 150 via current sensor 155. The signal is detected or sensed at current sensor 155, received by ECU 100, and processed by ECU 100 and its associated program to determine vehicle surplus energy conditions.

In other surplus energy modes such as when the vehicle is decelerating or braking, the momentum and engine-produced energy has to be dissipated to slow the vehicle. The illustrative system and method according to the present invention characterizes such surplus energy modes and engine load conditions as 'declining' engine load, which is determined by detecting a decline in the PW of the fuel injector excitation current. Thus, the pulse width (PW) characteristics of the current supplied to the fuel injector may be used to determine surplus energy modes including diminished or declining engine load conditions. As such, the surplus energy which exists when the vehicle is in any of the surplus energy modes is recoverable or transferable into stored electrical energy.

Referring again to FIG. 2, the illustrative system and method according to the present invention determines a declining engine load state by monitoring the fuel injector PW to be greater than 5 milliseconds and a decline in the PW duration is detected between successive fuel injector PWs (315). For example, the PW declines from a duration of 10 to 8 milliseconds. If both conditions are satisfied, processor 100 determines that a surplus energy mode exists; namely a declining engine load condition (e.g., by detecting a raised declining flag), and excitation current is then applied to the alternator to charge the battery (325). If either of the conditions is not met, the alternator remains off. When the PW is detected to be near zero or at around 2 to 3 milliseconds (330), another surplus energy mode exists; namely a diminished engine load state and the alternator is turned on (325). It is readily apparent to one skilled in the art that the PW duration values used in the above illustrative flow diagram may be different for different batteries, engines or vehicles and thus may vary. Appropriate PW duration values may then be substituted for the above described diminished or declining engine load states depending on battery, engine and vehicle specifications to accomplish the benefits of the present invention. It is also readily apparent to one ordinarily skilled in the art that the fuel injector pulse current may also be determined mathematically (in lieu of the fuel injector current sensor) by deconvolving the vehicle load current waveform into its constituent parts.

Figure 3:
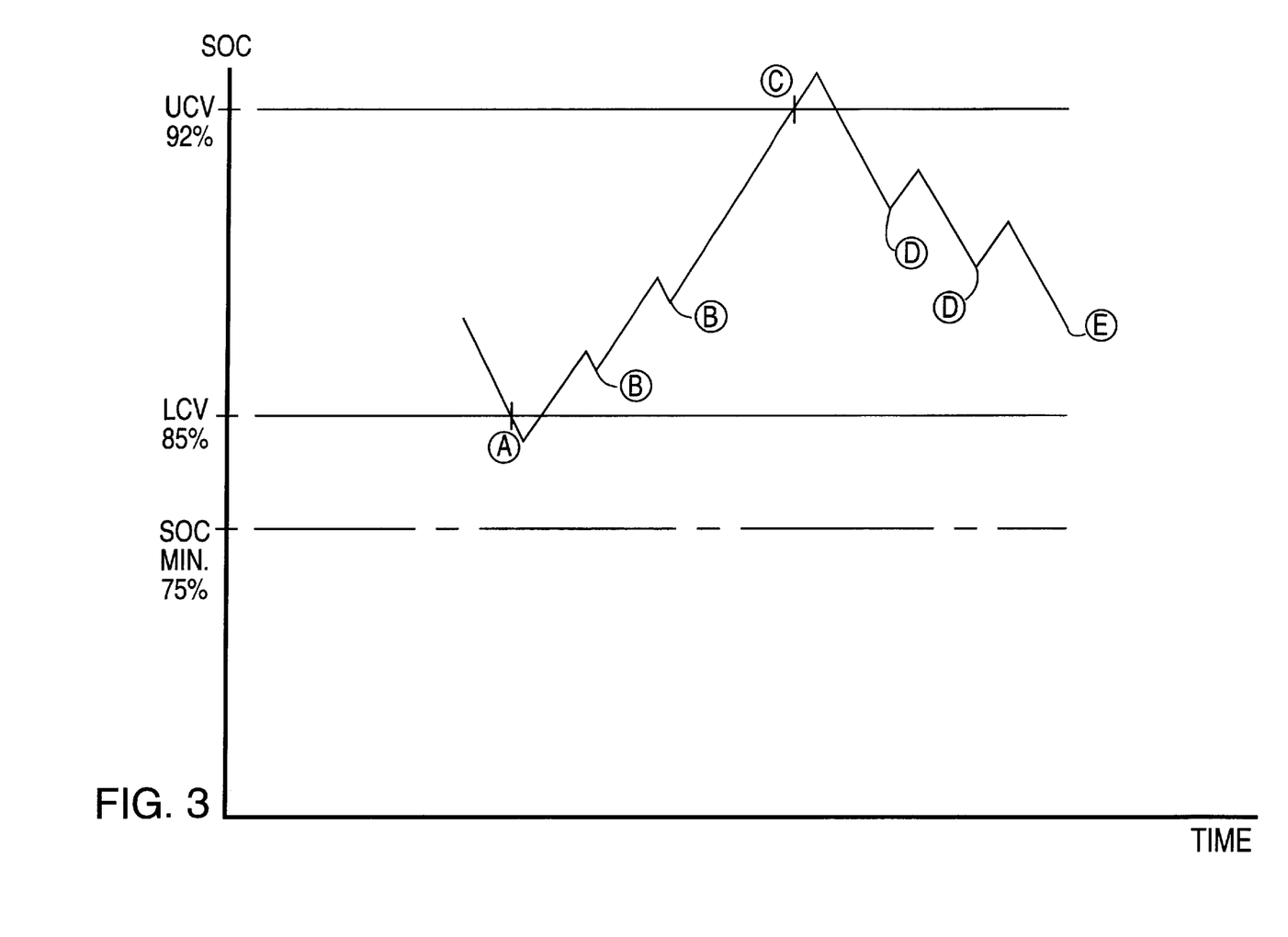
FIG. 3 is a graph depicting illustrative state of charge values of a battery with the usage of the system shown in FIG. 1.

Advantageously, charging the battery during such engine load conditions is in effect transforming energy, either momentum built up by the vehicle or power produced by the engine, which would otherwise have been spent as load loss into electrical energy which is stored by the battery. According to another illustrative embodiment of the present invention, the illustrative software controls as shown in FIG. 2 is further applied to transform surplus energy while maintaining the battery within an optimal operating range of SOC. Referring to FIG. 3, which is a plot of SOC values (y axis) vs. time (x axis), exemplary SOC values such as SOC safety minimum and SOC maximum values are set at around 75% and 100%, respectively. The exemplary optimal SOC range has a lower control value (LCV) of around 85% and an upper control value (UCV) of around 92%. When processor 100 determines that the SOC of the battery has fallen below LCV (at A), the alternator field current is turned on to charge the battery whenever any surplus energy mode is detected. For example, charge is applied during a diminished or declining engine load state and charge is not applied during vehicle acceleration (at B). It can be seen that the SOC values increase with time with the selective charging.

When SOC reaches the UCV (at C), the battery needs only be charged in some of the surplus energy modes to maintain the SOC within the optimal range. During such time (between C and E), the battery is preferably charged only when a declining engine load state is detected (at D). It can be seen that the usage of the system and method according to the present illustrative embodiment maintains the battery at peak operating efficiency while effecting little or no increased draw on the effective power output of the engine.

Figures 4, 4A:
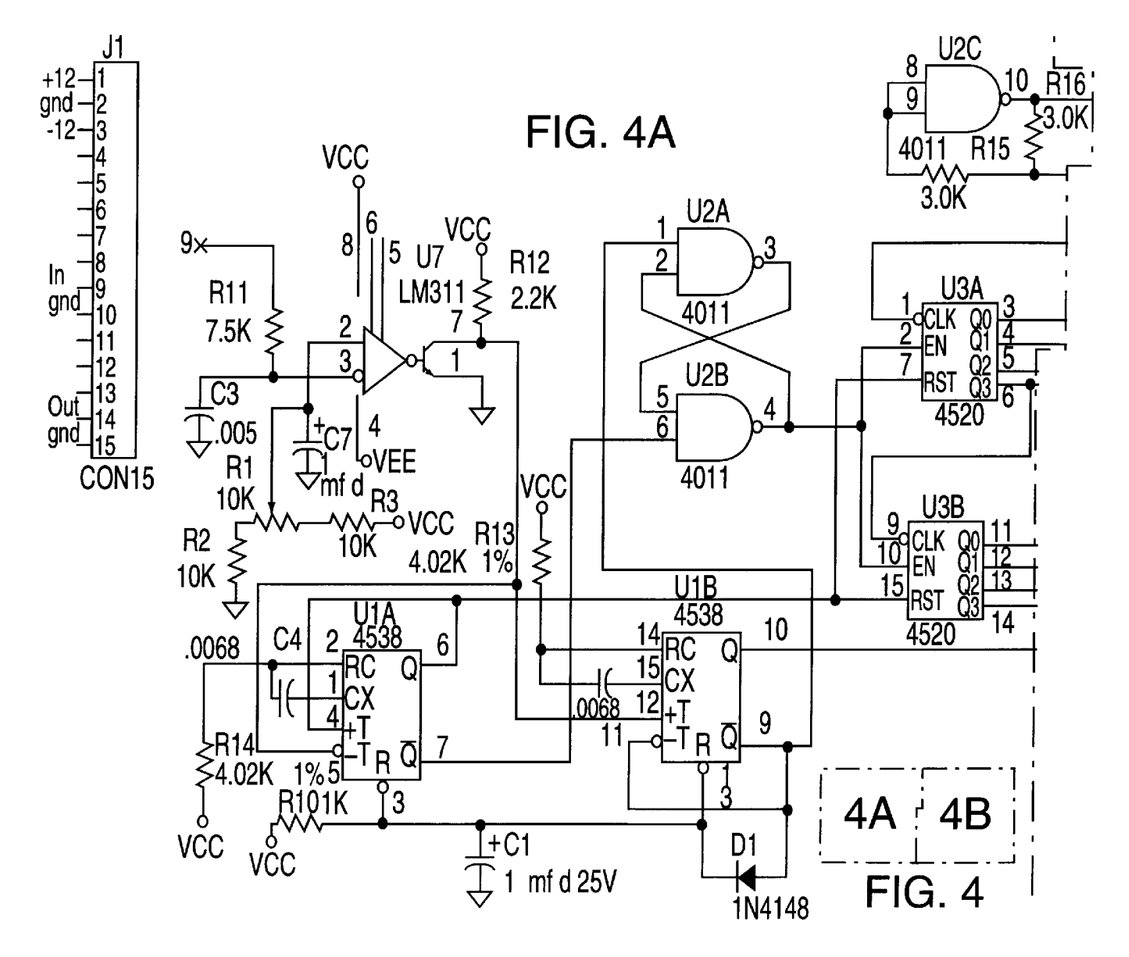
FIG. 4A and 4B are an illustrative schematic diagram, of a circuit for monitoring the energy supplied to the fuel injector.
Figure 4B:
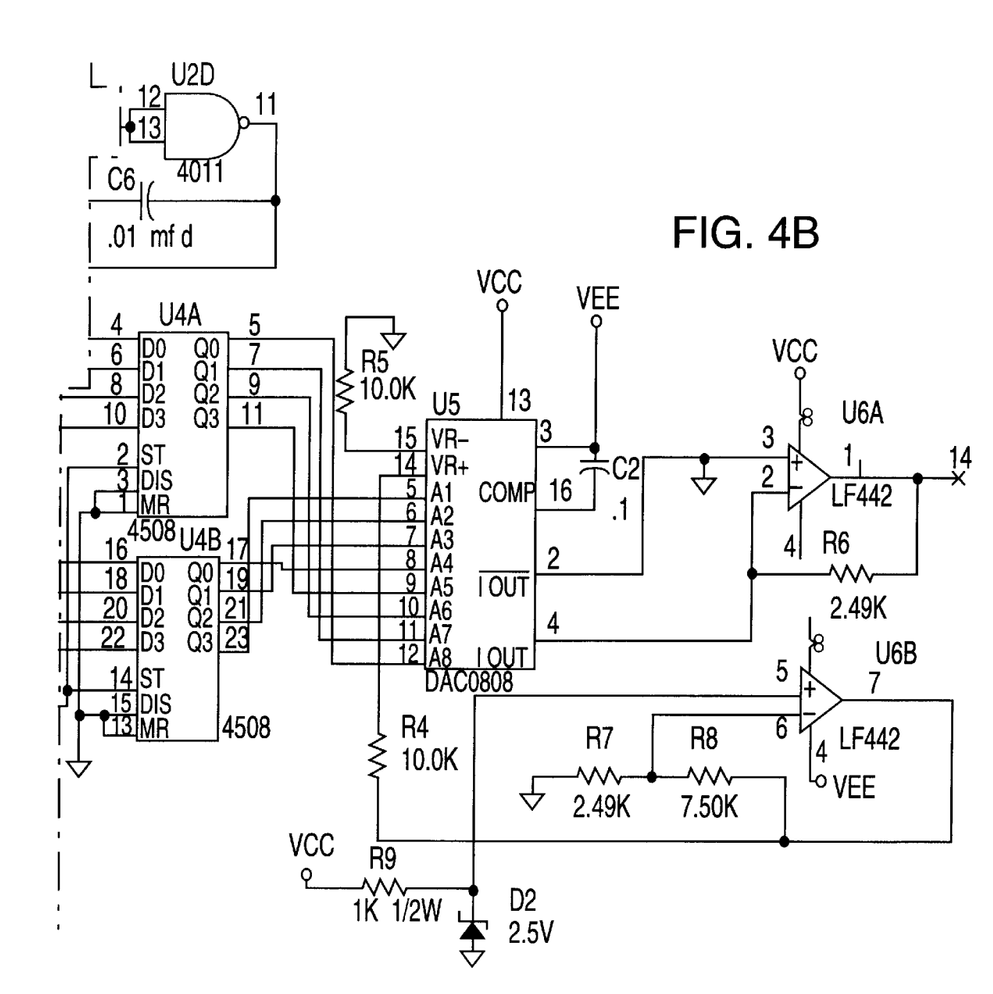

FIG. 4 shows an implementation of the circuitry for monitoring the fuel injector current pulse width. As shown in FIG. 4, pin 9 of the circuit may be connected to current sensor 155 (FIG. 1) and the current values are processed by the circuit and the processed values are output at pin 14 as data to the processor through the battery control unit 140.

The processor associated software program monitors safety conditions of the battery. One example is shown at step 400 (FIG. 2). When battery load exceeds a preset specified load maximum, excitation current is applied to the alternator (325). Other exemplary safety conditions may be an alarming battery status, which include internal resistance, polarization or temperature values exceeding or falling below preset safety values.

Figure 5:
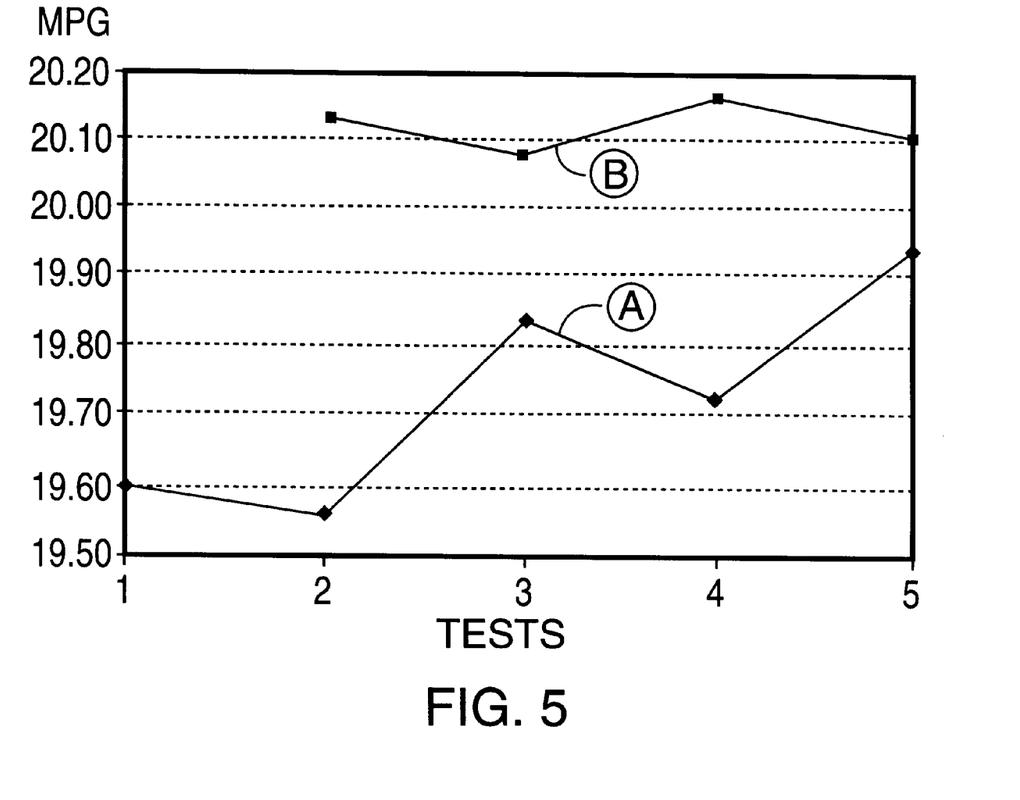
FIG. 5 is a graph depicting the test results using the system according to FIG. 1.

FIG. 5 shows the results of a test performed in accordance with Federal Test Procedures (FTP-75). A 1992 Ford Taurus Sedan having a conventional alternator/regulator was used as the test vehicle. FTP-75 tests with the device according to the present invention were performed as well as using the conventional alternator/regulator without the device according to the present invention. Using a current probe and oscilloscope and scope camera, the current waveforms for the alternator and battery were recorded for both systems. By use of integration of the current sensor signal or fast A/D conversion, currents for both the battery and alternator were measured and the battery State of Charge (SOC) was calculated. After the tests with application of the device according to the present invention, battery available capacity was 49 Ampere-Hours versus 35 Ampere Hours prior to the test thus indicating that in addition to fuel economy advantages, energy supplied to the battery was substantially increased. Curve A of FIG. 5 shows the MPG readings of a conventional alternator/regulator and curve B shows an increase of around 0.3 to 0.6 MPG when the device and method according to the present invention is applied.

It will be understood that various modifications can be made to the various embodiments of the present invention herein disclosed without departing from the spirit and scope thereof For example, engine manifold pressure can be monitored in lieu of fuel injector pulse width to determine engine load conditions. An absolute pressure of 10 Hg may correspond to PW of 2 milliseconds. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. A system for controlling an alternator for selectively charging a battery in a vehicle driven by an engine, comprising:
   a controller having a processor and an associated stored program for monitoring battery status;
   means for detecting signals representing surplus energy conditions;
   means for determining an engine operating condition including a plurality of surplus energy modes from said signals representing surplus energy conditions; and
   alternator control means for selectively turning on said alternator for charging said battery when one of said plurality of surplus energy modes is determined to be present.

2. The system according to claim 1, wherein said controller includes means for monitoring battery state of charge (SOC) values and said alternator control means selectively charges said battery to maintain the SOC of the battery within a specified range between a given lower limit and a given upper limit.

3. The system according to claim 1, wherein said means for deflecting signals includes a sensor for sensing fuel supplied to the engine.

4. The system according to claim 3 wherein said sensor senses electrical energy supplied to a fuel injector supplying fuel to said engine.

5. The system according to claim 4, wherein one of said plurality of surplus energy modes is determined to be a declining engine load state when said electrical energy supplied to said fuel injector has a pulse-width greater than a given duration and is declining within two successive fuel injection cycles.

6. The system according to claim 3, wherein one of said plurality of surplus energy modes is determined to be in a diminished engine load by said means for determining engine operating condition when said sensor senses fuel supplied to said engine is substantially zero.

7. The system according to claim 3, wherein said sensor senses manifold pressure of the engine.

8. The system according to claim 1, wherein one of said plurality of surplus energy modes is one of vehicle decelerating, braking, coasting, cruising or traveling downhill.

9. The system according to claim 1, wherein said alternator control means selectively charges said battery by controlling the excitation current supplied to said alternator.

10. The system according to claim 1, wherein said controller includes means for monitoring said battery status including battery internal resistance.

11. The system according to claim 1, wherein said controller includes means for monitoring said battery status including battery temperature.

12. The system according to claim 1, wherein said controller includes a battery current monitor for monitoring battery current magnitude and directions of flow.

13. The system according to claim 1, wherein said controller includes means for disabling said alternator control means from charging said battery for a given time period after an engine start condition.

14. The system according to claim 1, wherein said controller resides within an engine control unit (ECU) of said vehicle, said ECU further includes means for monitoring and controlling engine operations.

15. The system according to claim 2, wherein said given lower limit SOC is around 85% and said upper limit SOC is around 92%.

16. The system according to claim 5, wherein said declining engine load state includes the engine load condition when said vehicle is decelerating.

17. The system according to claim 1, wherein said means for detecting further detects rate of flow of energy to said engine.

18. A method for controlling an alternator for selectively charging a battery in a vehicle driven by an engine, comprising the steps of:
   monitoring battery status;
   detecting a signal representing a surplus energy condition;
   determining an engine operating condition including a surplus energy mode from said signal representing a surplus energy condition; and
   selectively turning on an alternator for charging said battery when said surplus energy mode is determined to be present.

19. The method according to claim 18 wherein said step of determining an engine operating conditions includes sensing fuel supplied to said engine.

20. The method according to claim 19, wherein said step of determining an engine operating condition includes sensing electrical energy supplied to a fuel injector supplying fuel to said combustion engine.

21. The method according to claim 20, wherein said surplus energy mode is determined to be in a diminished engine load state when said electrical energy supplied to said fuel injector is around zero.

22. The system according to claim 18, wherein said step of monitoring said battery status includes monitoring one of battery internal resistance, temperature and current magnitude.

23. The method according to claim 18, wherein said steps of monitoring battery status and determining engine operating conditions are performed by an engine control unit (ECU) of said vehicle.

24. The method according to claim 20, wherein said surplus energy mode is determined to be in a declining engine load state when said fuel injector has a pulse width greater than a given duration and declining in duration between two successive fuel injection cycles.

25. The method according to claim 18, wherein said plurality of surplus energy modes is any combination of engine or vehicle conditions including: when the vehicle is coasting; cruising at constant speed; operating at the low end of the engine power curve; decelerating; and traveling downhill.

26. The method according to claim 18, wherein said step of detecting signals includes detecting signals representing rate of flow of energy to said engine.

27. A system for controlling an alternator for selectively charging a battery in a vehicle driven by an engine, comprising:
   a processor and an associated stored program for monitoring battery status;
   a detector for detecting a rate of flow of energy to said engine;
   an engine operating condition monitor for monitoring a declining engine load state when said detector detects a declining rate of flow of energy to said engine; and
   an alternator controller for selectively turning on an alternator for charging said battery during said given declining engine load state.

* * * * *